Dec. 8, 1964  K. RAMSAYER ETAL  3,160,851
EQUIPMENT FOR DISPLAYING THE POSITION
OF CRAFTS ON THE MAP
Filed April 29, 1959  3 Sheets-Sheet 1

INVENTORS
Karl H. Ramsayer
Willy A. M. Kimbert

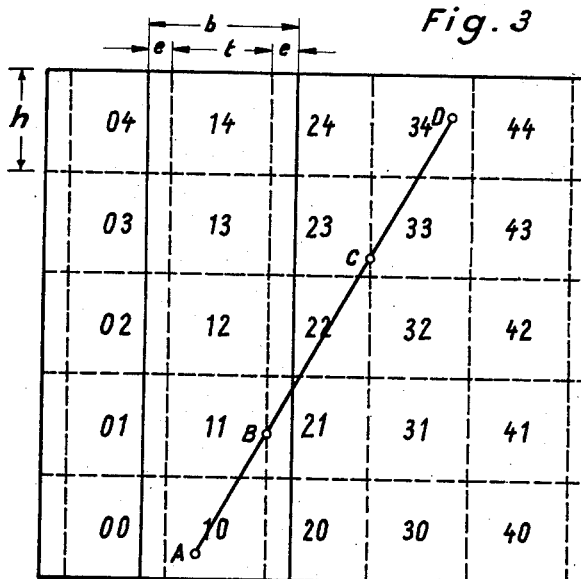
Fig. 3
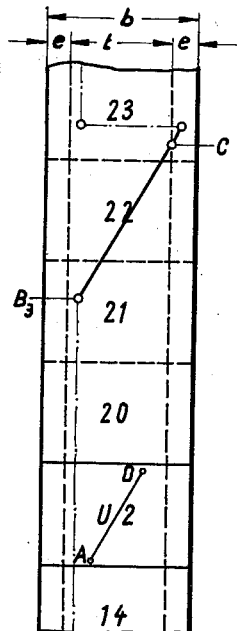
Fig. 5
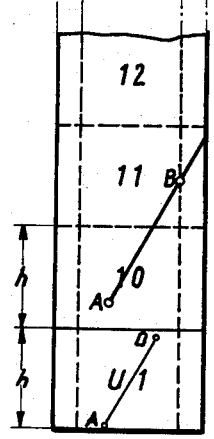
Fig. 4
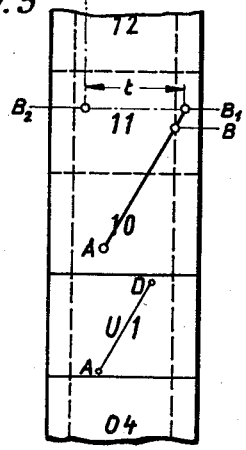

3,160,851
EQUIPMENT FOR DISPLAYING THE POSITION OF CRAFTS ON THE MAP
Karl Heinrich Ramsayer, 54 Hasenbergstrasse, Stuttgart, Germany, and Willy Arthur Max Neubert, Gerlingen, near Stuttgart, Germany; said Neubert assignor to said Ramsayer
Filed Apr. 29, 1959, Ser. No. 809,642
Claims priority, application Germany, May 12, 1958, R 23,312
15 Claims. (Cl. 340—24)

The present invention relates to equipment for displaying on a map the position of crafts (aircraft, vessels), in which two elements capable of being moved vertically in relation to one another are displaced in accordance with the two components of track passed by the craft by an associated navigation computer serving to effect the map display. Hitherto equipment of this kind have gained no considerable importance, because the display only included the area covered by the inserted single map sheet, or by a map strip stored in the form of a roller map, so that upon reaching the border of the map and upon inserting the adjoining map sheet or map strip there always became necessary a rather circumstantial resetting of the display mostly entailed by errors. According to the invention these disadvantages are eliminated by providing means for the additional automatic displacement of said both display elements by constant distances which means are operating when one or both display elements approach to the border of the visible field or strip of the map and which displace the display elements in such a manner that in the neighbouring field or strip of the map, which contains the area towards which the craft is moving, the same position is displayed as just before the displacement in the preceding field or strip of the map.

These additional displacements according to the invention may be arranged in two different ways. The first way is that both display elements are of the same kind and are so designed that when approaching to a border of the visible field or strip of the map, the particular display element is displaced back to the opposite border of the visible field of the map by a constant distance. The second way is that one of the display elements is a roller map which contains several strips of the map neighbouring to each other and is displaced according to one component of track passed by the craft, and that the other display element when approaching to a border of the visible strip of the roller is displaced by a constant distance back to the opposite border of the map strip and that simultaneously or afterwards the roller map is displaced by another constant distance so that in the new visible strip of the map the same position is displayed as just before the said displacements of the both display elements.

The said additional automatic displacements of the display elements and, furthermore, the automatic changing of the field or strip of the map substantially contribute to simplify the operation of the equipment. In addition, there are described further devices lying within the scope of the invention and aimed at facilitating the handling of the equipment, increasing the accuracy of the position indication, and enlarging the range of practical application thereof. To this measure there belongs in particular the likewise inventive storing of the track (or route) of the craft, by means of which errors in the display of the position can be avoided which otherwise would be liable to appear without this storing whenever the display is temporarily interrupted during the changing of the map or when correcting the position. The storing of the track to be travelled by the craft is also required for the above-mentioned reasons whenever, in accordance with a further idea of the invention, the position indication or display is carried out at will in two or more different map scales. According to the invention there is provided the arbitrary display of the position in two map scales of the same kind of projection, wherein the display is effected on a roller map of maps known as a roller map combining both map scales in a separate representation. The map with the large scale, known as the navigation map or chart, chiefly serves the route navigation. In the map with the small scale there is covered on one map sheet the area corresponding to the navigation map. This map is known as general map or index map (to a map series) and serves the long-distance navigation.

The employed type of map projection may be chosen arbitrarily within wide limits, of course under the condition that the equipment is combined with a navigation computer ascertaining the track components of the craft in accordance with the chosen type of map projection. There are many possibilities for ascertaining the map track components in the navigation computer and for transferring them to the map display.

The example of embodiment to be described herein presupposes the employment of a navigation computer delivering the map track components as the angle of rotation of two output shafts (see e.g. W. H. Coulthard: Aircraft Instrument Design, p. 163, Sir Isaac Pitman and Sons, Ltd., London). In addition thereto and for appropriate reasons the display equipment is to be spacially separated from the navigation computer. On account of this separation there are required remote transmission systems for which, in the exemplified embodiment, there are uniformly provided electrical potentiometer systems, consisting of a transmitter potentiometer and a receiver potentiometer, which is driven by a follow-up motor. The transmitter potentiometers together with the necessary gearings are assembled to form a special structural unit which is connected to the output shafts of the navigation computer. In the following this structural unit will be referred to as the intermediate device, and the device effecting the actual indication will be referred to as the map display. In addition, this arrangement offers the possibility that all those system elements which are capable of being spacially separated from the map display, can be disposed within the intermediate device, so that in this way the overall dimensions and the weight of the map display unit can be reduced.

This invention will be fully understood from the following description of one embodiment, serving the display of an aircraft position as fixed by a dead reckoning navigation, and shown in the accompanying drawings, in which:

FIGS. 3, 4 and 5 show the division of the employed map.

Figure 1:
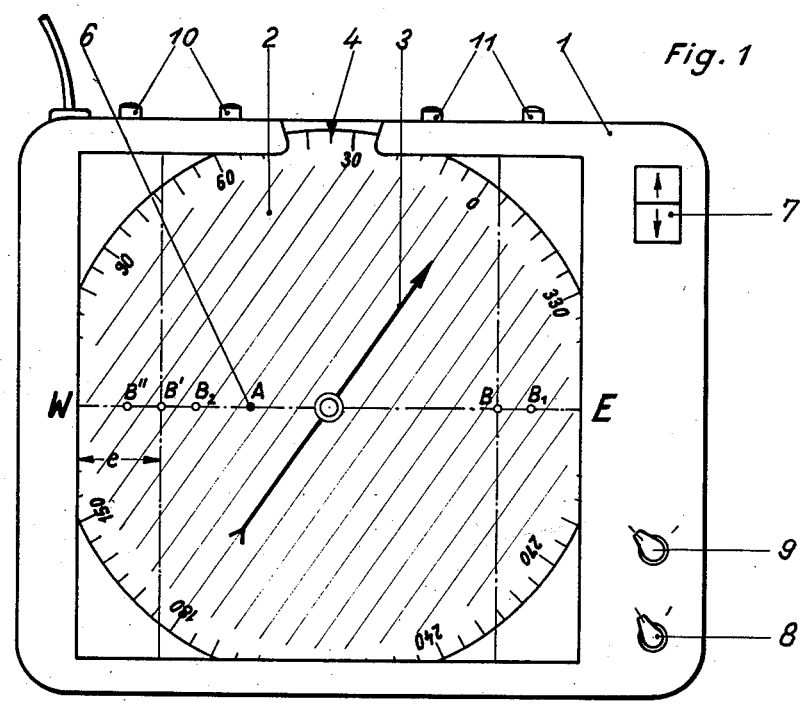
FIG. 1 is an exterior view of the map display.

The map display according to the showing of FIG. 1 consists of the housing 1 which, in its upper detachable portion, is provided with a cutout below which the not shown map is arranged. Over the map there is disposed a transparent and rotatable compass card or graduated card 2 with the course or direction indicator 3 in the shape of an arrow, and with a number of lines extending parallel in relation to the arrow-shaped course indicator, as well with an index 4, firmly attached to the housing, adapted to facilitate the reading of the compass card. The indication or display is effected by an optical system arranged inside the apparatus producing on the map from below a luminous point 6. This luminous point 6, for indicating the one component of track passed by the craft, e.g. the East-West component, is displaced along the straight line E—W plotted for enabling a better understanding. For indicating the other component, e.g. the North-South component, there is moved the map, i.e. from above towards below when the vehicle (aircraft) is moving in the northern direction. Of course, it is also possible to replace the optics to produce the luminous point without further ado by a recording stylus. The switch 7 serves the actuation of the map transport during the insertion and replacement of the roller map; by the action of switch 8 there may be selected one of the two provided map scales. By operating the switch 9 the display may be put out of operation during the flight, so that the further flight path or air route will be stored and is being considered when switching back to the normal position of switch 9. The two pairs of correcting keys or buttons 10 and 11 allow the keying-in of position corrections either prior to take-off or during the flight, when switch 9 is in the storing position. By actuating one of the two correcting keys or buttons 10 the map can be moved in the northern or southern direction and upon actuation of one of the two correcting keys 11 the luminous point can be moved in the eastern or western direction.

Figure 2:
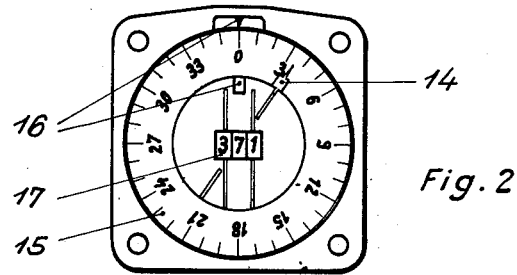
FIG. 2 shows a course or direction indicator which is necessary for the further inventive equipment of the map display.

Besides the components of the track passed by the craft for displaying the position in the map display, a dead reckoning computer carried aboard also ascertains or calculates the direction of the track which is indicated by a special course indicator according to FIG. 2 for the steering of the aircraft. According to the invention and by providing the rotatable compass card 2 the map display is equipped or adapted to read the course from any point to any other point of the map from the index 4, to which end the compass card, for determining the course, is turned in such a way that finally the family of parallel lines on the compass card will extend in parallel with the straight line connecting the two chosen points. This course is then transmitted to the course indicator by way of a remote transmission system and is indicated by the pointer 14 opposite the rotatable compass card 15. With respect to the lubber mark 16 firmly affixed to the housing, this compass card 15 indicates the direction of the track. In order to fly on the course as taken from the map the aircraft has to be controlled in such a way that the pointer 14 will always be in agreement with the fixed lubber mark 16; in this way the direction of the track will correspond to the course as taken from the map. For measuring the map course it is also conceivable to use instead of the compass card 2 any other suitable device, such as a rotatable ruler capable of being displaced over the map, and the rotation of which is transferred via a remote transmission system to the course indicator.

In FIG. 3 there is shown a navigation map which is divided in equisized and numbered rectangular fields of the width $t$ and the height $h$. From this map there is then cut out the North-South strip 10 . . . 14 enlarged by the overlapping portion $e$ on both sides, as shown in FIG. 4. In addition thereto there is still cut out the strip 30 . . . 34 likewise provided with an overlap on both the righthand and the lefthand side. Furthermore, from a second, exactly the same navigation map there are cut out the North-South strips 00 . . . 04, 20 . . . 24 and 40 . . . 44, including the overlapping portions on either side.

These map strips of the width $b$, as shown in FIG. 5, are stuck together to form a continuous map band, in the course of which between respectively two strips there is each time inserted one general map $U_0$, $U_1$ . . . $U_4$. The general maps are all of exactly the same type. On these general maps there is shown the total area as covered by the navigation map, only on a reduced scale (1:5 in the given example). By respectively adding one general map to each strip of the navigation map there is avoided the necessity of having to carry out a turning-through of the entire map band when changing the scale of display.

In FIG. 3 and in the general maps as shown in FIGS. 4 and 5 there is plotted the track of a vehicle travelling from A to D; parts of this track are shown in FIGURES 4 and 5. At the point B the vehicle crosses the vertical border of a map field. However, no sooner than after reaching the point $B_1$ (FIG. 5) there is released the backwards displacement of the indicating or display point (e.g. luminous point) in direction towards the opposite border of the map field. This return movement is terminated at the point $B_2$. For avoiding display errors the path of the backwards displacement $B_1B_2$ must be equal to the width $t$ of the map fields. At the point $B_1$ or during the backwards displacement to the point $B_2$ there is then released the automatic change of the visible map section. The map band is shifted or displaced by one length of a strip, during which the display changes from the map field 11 to the map field 21, and is now effected at the point $B_3$.

In FIG. 1 there are likewise shown the points pertaining to FIG. 5, i.e. the points A, B, $B_1$ and $B_2$, as well as the borders of the map fields extending through B and B', and the overlap $e$. In analogy to the release of the backwards displacement at point $B_1$, the release is effected in the case of the opposite travelling direction at the point B'', so that these points set a limitation to the indicating or display range. In the utmost the latter may be enlarged to extend to the width of the visible map section, and may be reduced to the size corresponding to the distance between the points B and B'. By an enlargement of the indicating or display range the orientation at the edge or border of the visible map section will be rendered difficult. A reduction of the range to the size corresponding to the distance between the points B and B' would be entailed by a to-and-fro motion of the display and of the map when travelling along one of the two borders of the map fields extending through the points B and B'. According to the invention this is avoided by displacing the release of the return movement into the overlapping portion $e$.

The kind of display described hereinbefore and based on the backward displacement at the indicating or display point, of course, may also be employed without further ado for effecting the display in the North-South component. The numerals as inserted in the individual (map) fields of the navigation map are required whenever the changing of the map field is not effected automatically but by hand. The map field number associated with the respective position appears automatically on a two-digit counter with two discs each numbered from 0 to 9 (not shown in FIG. 1) independently of whether the roller map is adjusted or set to the map field number indicated by the counter, or not. Independently of one another the two discs of the counter are stepped on during each backwards displacement of the display point by one digit, that is, the unit disc of the counter during a backwards displacement in the longitudinal direction of the map band, and the tens disc during a backwards displacement transversally in relation to the map band. On each map field there is required one equally lying marking sign which, upon turning of the map number as indicated by the counter, is brought into agreement with a mark firmly attached on the housing. To this end there is appropriately provided a circular mark arranged in the centre of the map field, as well as a likewise circular fixed mark which, accordingly, is arranged on a transparent plate or disc lying over the map.

Figure 6:
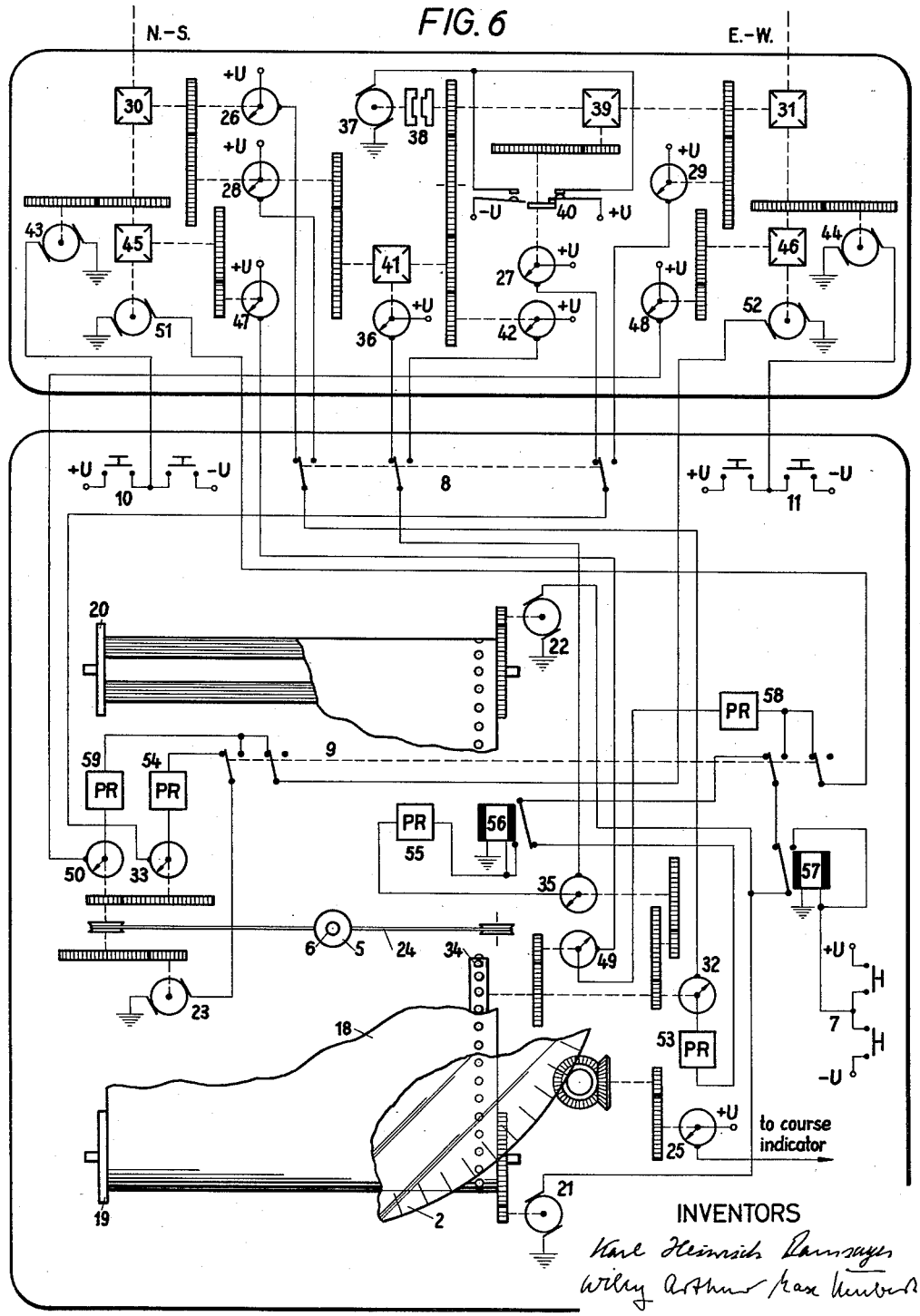
FIG. 6 is an interior view of an apparatus according to the present invention.

Referring now to FIGURE 6, the same shows an interior view of an apparatus according to the present invention. The apparatus includes a number of potentiometer-type transmission systems, i.e., transmission systems in which a master or transmitter potentiometer is so connected to a slave or receiver potentiometer that the latter assumes whatever angular position the former assumes. These systems per se are well known in the art.

In FIGURE 6, the roller map 18 is rolled on the two reels or spools 19 and 20 which are driven by the motors 21 and 22. The small optical system 5 producing the luminous point 6 is displaced by the motor 23 by way of a rope drive 24 in the East-West direction. Over the roller map there is disposed the already mentioned compass card 2 adapted to drive the transmitter 25 of the remote transmission system and which, in turn, transmits the position of the compass card 2 to the course indicator.

As already mentioned hereinbefore there are provided potentiometer-transmissions for controlling both the map transport and the displacement of the luminous point. Since on the roller map there are stored two different map scales, there are also provided in the intermediate device two transmitter potentiometers for each component (Navigation Map: North-South potentiometer 26; East-West potentiometer 27. General Map: North-South potentiometer 28; East-West potentiometer 29), which are geared down with respect to each other in the ratio of the two map scales 5:1. The transmitter potentiometers 26 and 28 are connected via the differential gear 30 in such a way with the North-South output shaft of the dead reckoning computer that one rotation of the potentiometer will correspond to the height $h$ of the map field (see FIG. 4). The associating receiver potentiometer 32 in the map display is controlled via a toothed wheel 34 by the movements of the roller map, in the course of which likewise one rotation corresponds to the height $h$ of the map field. Th transmitter potentiometers 27 and 29 for the East-West component are coupled via the differential gear 31 to the East-West output shaft of the dead rceokning computer, while the potentiometer 27 is connected via a further differential gear 39. The angles of rotation of the potentiometers 27 and 29 are in such a way adapted to the angle of rotation of the receiver potentiometer 33 that the displacements of the luminous point correspond to the East-West component of the flight path within the respective map scale.

For displaying the position on the general map, the switch 8 has to be placed in a position for connecting the transmitter potentiometers 28 and 29 to their respective receiver potentiometers 32 and 33. Each of the contacts shown in FIGURE 6 represents, in practice, a plurality of separate contacts (usually four) since all of the connections between the respective potentiometers have to be switched over. The map motors 21 and 22, or the luminous point motor 23, are controlled by the relays 53 and 54, respectively, in such a manner that the receiver potentiometers are continuously balanced or adjusted to the transmitter potentiometers, in the course of which the roller map and the luminous point are moved in a way that the luminous point will indicate the position in the general map, provided that by the automatic map transport one of the general maps inserted into the roller map had been turned into the indicating range of the map display.

If now there is effected a switching over to a display in the navigation map, e.g., switch 8 is switched back to the position shown in FIGURE 6, whereupon the receiver potentiometers 32 and 33 are connected to the transmitter potentiometers 26 and 27, in which there are stored the components of the travelled flight path according to the navigation map, so that without suffering any losses of accuracy, there may be performed a switching-over from the one to the other map scale. At the same time, as will be described in particular hereinafter, the corresponding section of the navigation map will be brought into the field of vision by way of the automatic map transport.

For the automatic map transport there is provided in the map display the receiver potentiometer 35 which is in such a way coupled to the potentiometer 32 that one rotation of the potentiometer 35 will correspond to the entire stored length of the roller map. Since the section of the navigation map which is necessary for the display, is a function of the North-South, as well as of the East-West component of the flight path, also the potentiometer 36 which is used for controlling the map transport, must be controlled or governed by both components. By the East-West component there is determined the selection of the strip, while the North-South component is responsible for selecting the correct map section out of the strip. As soon as the luminous point 6 reaches the righthand or lefthand display border it is moved back to the opposite border of the map field by way of a returning device, whereby at the same time the roller map is transported further by one strip. This returning device is disposed in the intermediate device and consists of the motor 37, of the single-revolution clutch 38, of the differential gear 39, and of the switch 40. As soon as the transmitter potentiometer 27 and the luminous point 6 connected therewith, reach an end position then the switch 40 will switch on the motor 37 in the proper rotational sense for giving via the single-revolution clutch 38 exactly one rotation on to the differential gear 39. The reduction gear with respect to the potentiometer 27 is chosen thus that this one rotation at the differential gear input will return the potentiometer 27 by exactly the width of one map field, so that the luminous point 6 will continue its display at the opposite display edge or border. In this arrangement the limit or end-position switch 40 is so adjusted that the angle of rotation between the two switching operations— this angle of rotation corresponds to the display range or area of the luminous point—is greater than the angle of rotation by which the potentiometer 27 is led back or returned by the single-revolution clutch 38. By means of this arrangement there is achieved the aforementioned overlap in the display. By this return movement there is caused no error in the display, because the display movements appearing during the return are superimposed by the differential gear 39 upon the backwards displacement. The angular rotation as defined by the single-revolution clutch 38 is transferred via the differential gear 41 also to the map transport potentiometer 36, whereby the reduction gear is chosen thus that this potentiometer is just displaced by the value corresponding to one length of strip of the map. As soon as the potentiometer 36 begins to move the polarized relay 55 is energized which in turn energizes the relay 56. By the switching over of the contact of relay 56 the map motors 21 and 22 are connected to the polarized relay 55 and the map is moved till the potentiometer 35 is again balanced to the potentiometer 36, that means that the map is transported further by one strip length. By the term one strip length there is supposed to be understood the length of one strip of the navigation map including the general map portion attached thereto. The potentiometer 32 which, during the map transport, performs six rotations—corresponding to the map field number per strip—then effects again an exact balancing of the map setting. Via the other input of the differential gear 41 the correspondingly geared-down continuous rotation of the potentiometers 26 and 28 is transferred to the potentiometer 36, so that within one strip the potentiometers 26 and 36 act like a Coarse-Fine System: the potentiometer 36 coarsely adjusts the map to display the proper map section, while the potentiometer 26 effects the fine adjustment. Accordingly, to the two component potentiometers 26 and 27, adapted to store the indication or display in one field of the navigation map, there belongs as the third storage the potentiometer 36, serving to select the proper map field out of the roller map.

Accordingly, for the display on the general map there is provided besides the component storage devices 28 and 29, the potentiometer 42 which, upon switching over to the display in the general map, transfers one of the general maps as provided on the roller map, to the display field. In the given example there is arranged or provided a general map at the beginning of each strip. Whenever the potentiometer 42 is adjusted in such a way that its zero position will come to fall on the middle of the first general map on the roller map, and when at each change of strips the potentiometer 42 is switched further by the amount corresponding to one length of strip—the potentiometer 42 is likewise driven by the single-revolution clutch 38 via a suitable reduction gear—then its position respectively corresponds to the middle of the general map preceding the strip. Upon switching over to "General Map" the receiver potentiometer 35 is connected to the potentiometer 42, and after the general map has been turned or moved into the field of vision the potentiometer transmission 28–32 carries out the fine adjustment in accordance with the North-South component of the position in the general map.

Insertion and replacement of the roller map is accomplished by actuating one of the two buttons 7. By either button the relay 57 is operated which connects the map motors 21 and 22 to the buttons 7. For effecing the first setting of the luminous point display prior to the take-off, and for correcting the display during the flight there are provided two correcting motors 43 and 44, which are connected with the correcting keys 10 and 11 permitting the transfer of further or additional rotations to the transmitter potentiometers via the differential gears 30 and 31. According to the invention the correction during the flight is effected in such a way that by actuating the switch 9 at the time $t_0$, with respect to which an exact position determination has been carried out with the aid of another navigational system, the luminous point display is put out of commission, so that the correction may be carried out slowly by paying the necessary attention thereto, and in that subsequently to the reconnection of the display at the time $t_0 + \Delta t$ the flight path as travelled during the time $\Delta t$ will be automatically taken into consideration. This is accomplished in that the potentiometer transmissions 26–32 and 27–33 (FIG. 6), as used for the display purpose in the navigation map, are being switched off by operating switch 9 at the time position $t_0$, so that the display will come to a standstill. The correcting movements of both the motors 43 and 44 are transmitted via the differential gears 45 and 46 to the transmitter poentiometers 47 and 48, to which there are now connected the receiver potentiometers 49 and 50 in the map display.

These correction transmissions 47–49 and 48–50 now control by the polarized relays 58 and 59 the display elements in the map display in accordance with the performed correction, while the same correcting movements, via the differential gears 30 and 31, are also transmitted to the transmitter potentiometers 26 and 27, where they are superimposed upon the values as obtained from the outputs of the dead reckoning computer. For reasons of accuracy it is appropriate that the correction transmissions 47–49 and 48–50 are geared-up with respect to the display transmissions 26–32 and 27–33, so that e.g. four rotations of the potentiometers 47 and 49 will correspond to the height of the map field. Upon termination of the correction the remote transmissions 26–32 and 27–33 are switched-on again by returning switch 9 in its normal position, and the display is continued from the corrected position. For effecting the proper correction transmission via the potentiometers 47–49 and 48–50 the associating potentiometers must be in the same output or starting position at the beginning of the correcting process. This is accomplished by way of two syncronising motors 51 and 52 which, via the differential gears 45 and 46, continuously balance or adapt the potentiometers 47 and 48 to the potentiometers 49 and 50, so that at the beginning of the correction there is ensured the same starting position.

The backwards displacement of the display element effected in the described example of embodiment by means of a single-revolution clutch 38 and the differential gear 39 upon reaching a final or end position can also be achieved by a corresponding arrangement of electrical remote transmission systems. In such a case the transmission system employed for controlling the respective display element is to be embodied in such a way that one rotation of the electrical component transmitter in the intermediate device, and one rotation of the associated component receiver in the map display correspond to the width of the map field, and in that upon reaching the end position of the display element connected to the component receiver there is initiated a switching operation by which the remote transmission is disconnected, the display element is returned by the associating motor by about one width of the map field, and by which, thereupon, the remote transmission is switched-on again, whereby the component receiver is again balanced or adjusted to the component transmitter, but the component receiver is turned by one rotation with respect to the first position, so that the display element connected therewith will have been returned by exactly on width of the map field. However, since the component transmitter remains to be connected to the navigation computer also during the return movement, the flight path will not be lost during the backwards displacement, but is taken into consideration upon reinsertion of the remote transmission.

The automatic map transport which, in the example as described in the foregoing, is carried out by means of the potentiometers 35, 36 and 42 may also be effected by way of contact controls. In this case, instead of the potentiometer 36, there has to be provided a contactor having so many unambiguous positions as map fields are provided on the roller map. By the North-South component the contactor is moved on by one step with respect to each map field, while, if the East-West component is reaching one of the switching limits, it is moved on by respectively the number of fields corresponding to the length of the map strip, hence, in the present example the contactor is turned six steps further. In the map display there has to be provided, instead of the potentiometer 35, a corresponding contactor, so that via suitable relay circuits the map motors 21 and 22 are controlled in such a way that the contactor of the map display is balanced or adjusted to the position of the contactor in the intermediate device, in other words, the map is transported to the proper map field. As regards the contactor proposed to be employed instead of the potentiometer 42, and which is adapted to control the roller map to the general map preceding the respective map strip, analogous considerations are applicable.

While the principles of the invention have been described above in connection with specific embodiments, and particular modifications thereof, it is to be clearly understood that this description is made only by way of example and not as a limitation on the scope of the invention as set forth in the objects thereof and in the accompanying claims.

What is claimed is:

1. In an apparatus for displaying the position of a craft on a map, the combination which comprises: roller means having two rollers for supplying and taking up a strip map composed of individual map sections constituted by parallel strips of an overall map which strips are assembled to form a single composite strip such that one edge portion of each section corresponds geographically to the opposite edge portion of an adjacent section, said roller means feeding said strip map through a display area; indicator means cooperating with that part of the strip map which at any given instant is located in said display area, said indicator means being movable only in a direction transverse to the direction in which the strip map is moved as it is wound from one of said rollers to the other; actuator means responsive to the instantaneous position of the craft and connected to said roller means and to said indicator means for varying the longitudinal position of the strip map and for varying the transverse position of said indicator means such that said indicator means indicates on the map the geographical position of the craft; and change-over means effective when the geographic position being indicated on any one map section is in the region of an edge portion thereof and connected with both said roller means and said indicator means for bringing into said display area a new map section which has on the opposite side of said display area an edge portion corresponding geographically to the edge portion of the old map section and for moving said indicator means transversely so as to indicate on the new map section the same geographic position as was previously indicated on the old map section, in consequence of which said roller means serve (1) to move different map sections into said display area and (2) to effect the actual position indication, in longitudinal direction, on any one map section.

2. The combination defined in claim 1 wherein said indicator means comprise means for producing a light spot on the strip map.

3. The combination defined in claim 2 wherein said means for producing said light spot are arranged beneath the display area.

4. The combination defined in claim 1 wherein the strip map includes map sections of different scales, and wherein said actuator means incorporate means for actuating said roller means and said indicator means as a function of said different scales.

5. The combination defined in claim 1 wherein said actuator means comprise a navigation computer forming an entity separate from the apparatus, and wherein transmission means are provided between said computer and apparatus.

6. The combination defined in claim 5 wherein said navigation computer computes the longitudinal motion to be imparted to said strip map by way of said roller means as well as the transverse motion to be imparted to said indicator means.

7. For use in an aircraft, the combination defined in claim 33 wherein said navigation computer computes the ground speed of the aircraft as well as the true heading thereof.

8. The combination defined in claim 5 wherein the starting position which said indicator means is to occupy upon change-over is stored in said computer.

9. The combination defined in claim 1, further comprising transparent means forming an adjustable compass rose mounted over said display area.

10. The combination defined in claim 9, further comprising an indicating instrument forming an entity separate from the apparatus for indicating the heading to which said compass rose is set, whereby the course to be followed, as indicated by said compass rose, may be read from said indicating instrument.

11. For use in an aircraft, the combination defined in claim 38, further comprising a ground speed indicator incorporated in said indicating instrument.

12. The combination defined in claim 1 wherein each map section has a total width equal to $t+2e$ wherein $t$ is equal to the width which each map section would have if all map sections were cut from the same map and wherein $e$ is equal to a predetermined overlap on each edge of a strip having a width $t$.

13. The combination defined in claim 12 wherein said change-over means become effective when the geographic position being indicated on any map section is in the overlap $e$ thereof, whereby hunting between map sections, when the craft is moving over territory corresponding to the junction of the main part of each map section and its overlap, is prevented.

14. The combination defined in claim 1 wherein the strip map includes, between said map sections, special map sections constituted by said overall map on a reduced scale.

15. The combination defined in claim 1, wherein said indicator means comprise a rope transmission.

References Cited by the Examiner
UNITED STATES PATENTS

| | | | |
|---|---|---|---|
| 2,296,032 | 9/42 | Hammond | 340—24 |
| 2,502,991 | 4/50 | Rast et al. | 346—8 |
| 2,533,029 | 12/50 | McNisch et al. | 346—8 |
| 2,635,372 | 4/53 | Field | 340—24 XR |
| 2,669,500 | 2/54 | Och et al. | 346—8 |
| 2,692,377 | 10/54 | Brettell | 340—24 |
| 2,714,199 | 7/55 | Adams et al. | 340—24 |
| 2,762,992 | 9/56 | Schmid | 340—24 |
| 2,769,977 | 11/56 | Roberts et al. | 346—8 XR |
| 2,836,816 | 5/58 | Allison et al. | 343—112 |
| 2,857,234 | 10/58 | Murray | 340—24 XR |

NEIL C. READ, *Primary Examiner.*

E. JAMES SAX, BENNETT G. MILLER, *Examiners.*

UNITED STATES PATENT OFFICE
CERTIFICATE OF CORRECTION

Patent No. 3,160,851                                December 8, 1964

Karl Heinrich Ramsayer et al.

It is hereby certified that error appears in the above numbered patent requiring correction and that the said Letters Patent should read as corrected below.

Column 9, line 40, for the claim reference numeral "33" read -- 6 --; column 10, line 8, for the claim reference numeral "38" read -- 10 --.

Signed and sealed this 19th day of October 1965.

(SEAL)
Attest:

ERNEST W. SWIDER
Attesting Officer

EDWARD J. BRENNER
Commissioner of Patents